United States Patent [19]

Reedy

[11] 4,158,453
[45] Jun. 19, 1979

[54] BOTTOM OPERABLE TANK CAR VALVE

[75] Inventor: Charles E. Reedy, Bridgeton, Mo.

[73] Assignee: ACF Industries, Incorporated, New York, N.Y.

[21] Appl. No.: 834,655

[22] Filed: Sep. 19, 1977

[51] Int. Cl.² ........................................ F16K 27/03
[52] U.S. Cl. ..................................... 251/144; 137/74
[58] Field of Search ............... 251/144, 82, 216, 218, 251/219, 220, 291; 137/74, 797

[56] References Cited

U.S. PATENT DOCUMENTS

| | | | |
|---|---|---|---|
| 2,092,926 | 9/1937 | Lithgow | 251/144 X |
| 3,177,887 | 4/1965 | Priese | 251/315 X |
| 3,219,054 | 11/1965 | Elder et al. | 137/797 |
| 3,656,710 | 4/1972 | Shaw | 251/144 |
| 3,721,424 | 3/1973 | Vanderlinden | 251/144 |
| 3,981,481 | 9/1976 | Reedy et al. | 251/144 |
| 4,011,885 | 3/1977 | De Flees | 251/144 X |

FOREIGN PATENT DOCUMENTS 970 of 1904 United Kingdom ................... 251/82

*Primary Examiner*—William R. Cline
*Attorney, Agent, or Firm*—Henry W. Cummings

[57] ABSTRACT

In accordance with the present invention, the bottom operable tank car valve assembly described in U.S. Pat. No. 3,981,481 is simplified and improved and a supplemental sealing arrangement is provided. In the improved design, the valve body includes a flange portion which is attached to a standard tank car universal flange and an inwardly extending circumferential portion upon which a valve closure seats in closed position. The valve closure includes a keeper which maintains a circumferential elastomeric seal in place engaging the closure. Clearance is provided between the closure operator, and the valve closure so that if the circumferential seal softens, melts or burns, the closure can move vertically downwardly relative to the closure operator, and the valve closure will engage the valve seat on the valve body in place of the circumferential seal, to substantially prevent escape of lading from the tank.

10 Claims, 8 Drawing Figures

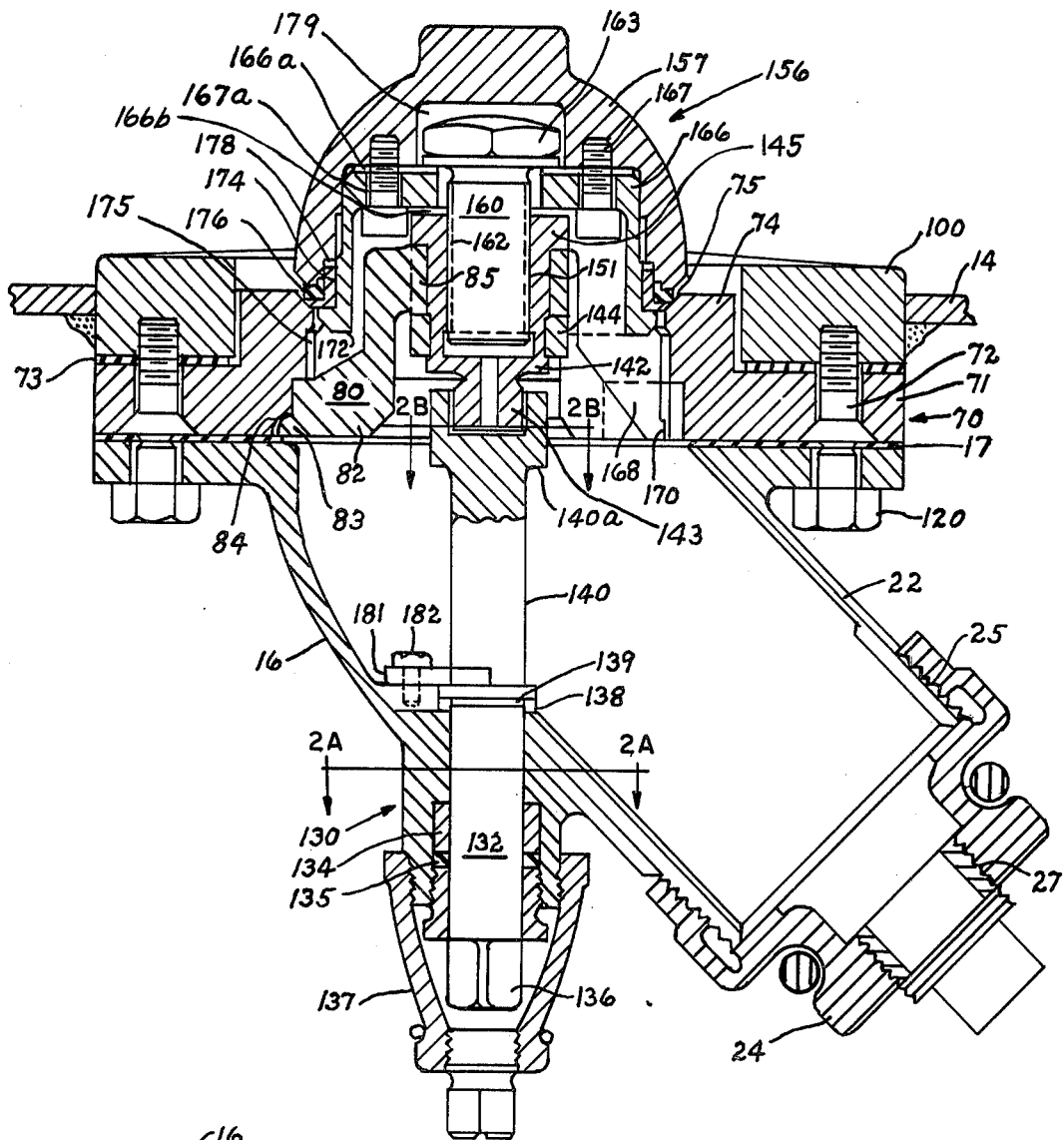
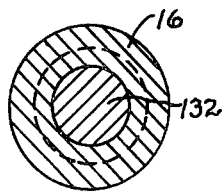
FIG. 2A.
FIG. 2.
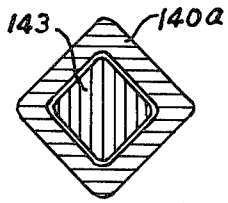
FIG. 2B.

BOTTOM OPERABLE TANK CAR VALVE

BACKGROUND OF THE INVENTION

In the U.S. Pat. No. 3,981,481 granted Sept. 21, 1976, assigned to the same assignee as the present application, a bottom operable tank car valve is disclosed including a valve body attached to an opening in the bottom of the tank as shown in FIG. 1 of the drawings. The valve body includes an opening centrally thereof for loading and unloading the lading. A depending housing is attached to the valve body with mechanical fasteners which constitute a shear plane. The housing includes a loading and unloading spout extending radially outwardly from the outlet. An operator assembly for loading and unloading the tank is mounted within a bore in the lower portion of the housing. The operating assembly includes a lower operator which extends below the valve housing and which is adapted to be engaged by a suitable unloading tool. The lower operator has a polygon opening engaging with clearance a cooperating polygon head on an upper valve operator which extends upwardly within the opening in the valve body. A retainer assembly attached to the valve body maintains the upper operator vertically fixed and spaced from the walls of the valve body. The upper operator engages a depending member from a valve closure. The closure is movable between a closed position engaging the top surface of the retainer assembly, and an open position to load or unload the lading.

In accordance with one embodiment in the U.S. Pat. No. 3,981,481 the upper operator engaging the depending valve closure operator is located within the valve body at a point above the shear plane defined by the mechanical fasteners holding the housing in engagement with the valve body as shown in FIG. 10 and 11 of the U.S. Pat. No. 3,981,481 and FIG. 1 herein. Thus in the event of impact to the depending housing, the housing will shear off along the shear plane provided in the mechanical fasteners, and the lower operator will drop off, leaving in place the upper operator within the valve body. After such an impact, the car can be unloaded by attaching another housing or a plate to support the retainer and applying a suitable tool to the connecting portion on the upper operator to open the valve closure and unload the car.

SUMMARY OF THE INVENTION

An object of the present invention is to provide a supplemental sealing arrangement whereby if the elastomeric seal in the bottom operable valve assembly disclosed in U.S. Pat. No. 3,981,481 were to melt, soften or burn, a supplemental seal will become operative to substantially prevent escape of lading from the tank.

Another object of the present invention is to improve and simplify the bottom operable valve assembly disclosed in U.S. Pat. No. 3,981,481.

In accordance with the present invention, a bottom operable tank car valve body includes an inwardly extending circumferential portion upon which a valve closure seats in closed position. The valve closure includes a keeper which maintains an elastomeric circumferential seal in place on the closure, and clearance is provided between the valve operator, and the valve closure. If the circumferential seal softens, melts or burns, the closure can move vertically downwardly relative to the valve operator, and the closure will engage the valve seat in the valve body, and substantially prevent escape of any lading from the tank.

The valve body includes a flange portion which is attached to a tank car universal flange, and a seal is preferably positioned between the valve body and the universal flange. A retainer engages the inner surface of the valve body and a plurality of arms extend radially inwardly and engage a valve operator to maintain the valve operator spaced from the valve body and vertically fixed. The valve operator engages the closure operator to raise and lower the same.

The valve assembly of the present invention may be applied to new tank cars or may be retrofitted to existing cars.

THE DRAWINGS

FIG. 1 is a sectional view of one embodiment of the bottom operable loading and unloading valve disclosed in U.S. Pat. No. 3,981,481;

FIG. 2 is a sectional view of the bottom operable outlet valve assembly of the present invention;

FIG. 2A is a sectional view looking in the direction of the arrows along the line 2A—2A in FIG. 2;

FIG. 2B is a sectional view looking in the direction of the arrows along the line 2B—2B in FIG. 2.

DESCRIPTION OF PRIOR ART

Figure 1:
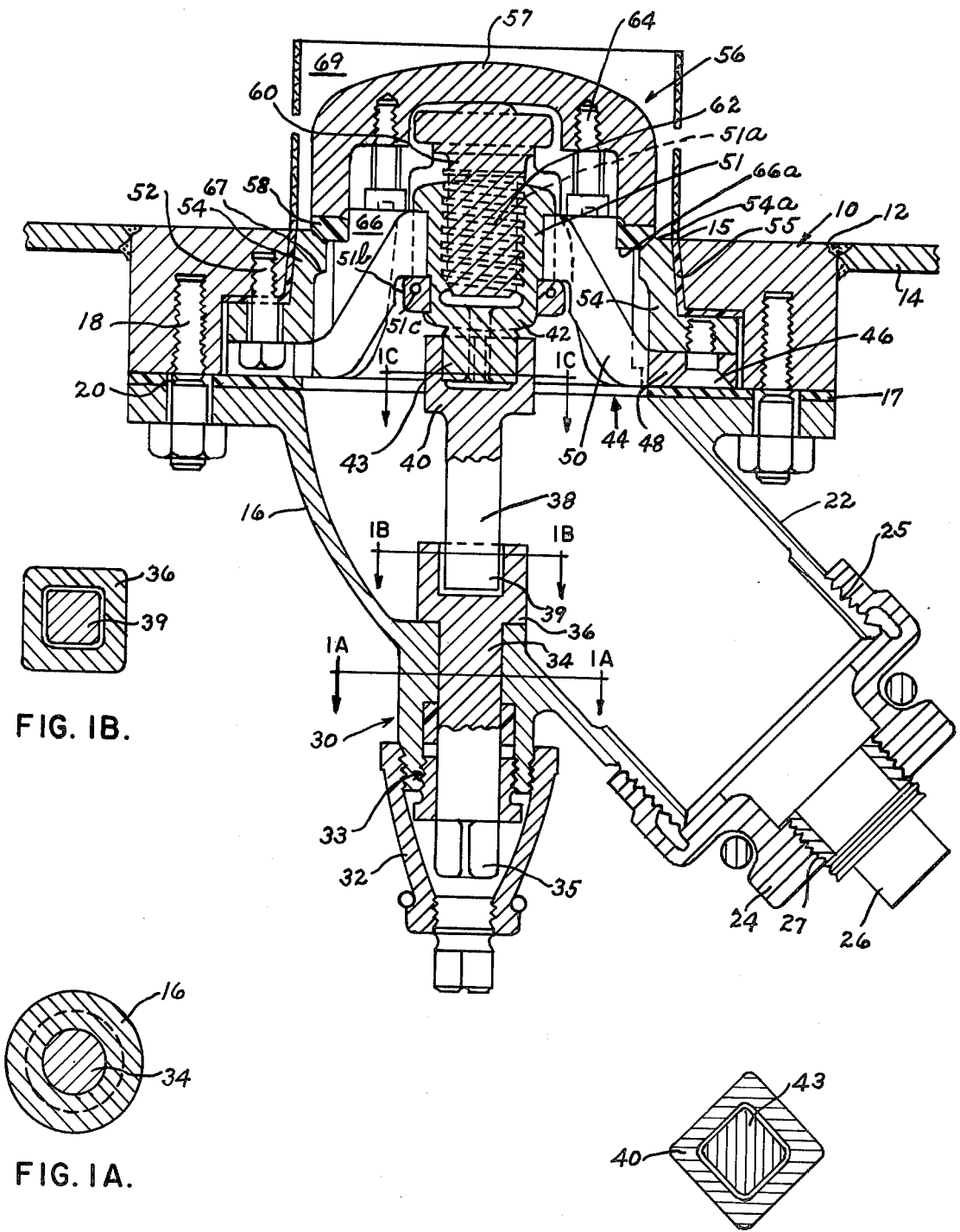
FIG. 1A is a sectional view looking in the direction of the arrows along the line 1A—1A in FIG. 1.
FIG. 1B is a sectional view looking in the direction of the arrows along the line 1B—1B in FIG. 1.
FIG. 1C is a sectional view looking in the direction of the arrows along the line 1C—1C in FIG. 1.

The bottom operable outlet valve assembly illustrated in FIG. 1 of the drawings is described in U.S. Pat. No. 3,981,481 assigned to the same assignee as the present application and is hereby incorporated into the present invention by this reference. It is sufficient for an understanding of the present invention to point out that this outlet valve assembly includes a valve body 10 which is welded within an opening 12 to the bottom of a tank 14. Valve body 10 is provided with an opening 15 centrally thereof. A depending housing 16 is attached to the valve body 10 with mechanical fasteners 18 which define a shear plane 20. The housing includes a loading and unloading spout 22 including a cap 24, which is attached to threaded fittings 25. In transit a plug 26 is inserted into threaded opening 27 in cap 24. At destination plug 26 is loosened to determine if there has been leakage of the lading in transit. A tube for heating congealed lading may also be attached at this point. The lading is usually unloaded through a hose attached to threads 25. However, occasionally plug 26 is removed and a smaller hose is attached to threads 27.

A lower valve operator assembly 30 is mounted within housing 16 including a removable cap 32. A vertically extending first operator 33 includes a circular body portion 34 (FIG. 1A), a lower tool connection portion 35, and an upper connection portion 36 of square or non round polygon cross section which engages a second operator 38 having a smaller square or non round polygon cross section 39 (FIG. 1B). Second operator 38 has an upper portion 40 also of square or polygon cross section which engages an upper operator 42 having a depending connection portion 43 of smaller square or polygon cross section than portion 40 of operator 38 (FIG. 1C).

A retainer assembly 44 is mounted within opening 15 in valve body 10. Second mechanical fasteners 46 maintain a first retainer portion 48 in place within valve body opening 15 and attached to second retainer portion 54. First retainer portion 48 includes inwardly and upwardly extending radially spaced arms 50 which engage an upper extension 51 of upper operator 42 and a split collar 51b held in place with U rods 51c. Arms 50 maintain upper operator 42 spaced from the walls of valve body 10. Third mechanical fasteners 52 maintain second retainer portion 54 in engagement with a seal 55 which engages horizontal surface 13 of valve body 10.

A valve closure assembly 56 includes a valve closure 57 having a depending elastomeric seal 58. Closure 57 is movable vertically between a closed position engaging the seat 54a of second retainer portion 54 and an open position allowing loading and unloading of the lading through spout 22.

Valve closure 57 has a depending member 60 which is threaded at 62 and engages a threaded portion 51a of extension 51 of upper valve operator 42. Fasteners 64 hold in place guides 66 depending from closure 56 which hold in place seal 58, with a shoulder 66a.

It will be apparent that when cap 32 is removed and a suitable tool is applied to the connecting portion 35, the operators 34, 38, and 42 will rotate and the threads 51a of operator 42 will engage threads 62 of depending closure member 60.

Guides 66 move within the space between retainer arms 50, prior to vertical movement as seal 58 wipes seat 54a. Guides 66 then engage radially spaced arms 50 which prevent further rotation of closure 57, but causes vertical movement thereof. Guides 66 engage catch 67 on second retainer portion 54 to limit vertical movement of closure 57 in the open position. Rotation in the opposite direction lowers the valve closure.

If desired, second retainer portion 54 may also hold in place a screen 69 to prevent objects in the tank from contacting valve closure 57.

As mentioned above, this bottom operable valve is advantageous in that in the event that the housing 16 is impacted the housing will shear off along the shear plane 20 and the lower valve operators 34 and 38 will drop off below upper operator 42. Thus after such impact, upper operator 42, retainer assembly 44 and valve closure assembly 56 will remain in place. The car can be unloaded by attaching another valve housing 16 including an operator 30 or by attaching a plate to support retainer 44 having an opening for inserting a suitable tool to engage the connecting portion 43 of upper operator 42.

Furthermore, first retainer portion 48 can be removed with lading in the tank by removing fasteners 64 and U rods 51c. Second retainer 54 and closure assembly 56 can be removed from outside of the car when the lading has been removed from the tank. However in this arrangement, if seal 58 softens, melts or burns, lading can escape. If housing 16 is sheared off the lading could escape from the outlet, causing injury to persons or property.

Furthermore, it is desired to attach the valve body to a universal tank car flange which is present on most existing and new tank cars.

Also, it is desired to improve and simplify the construction of the valve assembly disclosed in U.S. Pat. No. 3,981,481.

DESCRIPTION OF PRESENT INVENTION

In accordance with the present invention the bottom operable valve assembly shown in FIG. 1 is modified as shown in FIG. 2.

In this embodiment a universal flange 100 is welded to the tank 14. A valve body 70 having a flange portion 71 is attached to the universal flange 100 with fasteners 72. A seal 73 is provided between universal flange 100 and flange portion 71. Circumferentially spaced from fasteners 72 are fasteners 120 which hold in place depending housing 16 and a seal 17. Extending inwardly from flange portion 71 and upwardly is a valve seat portion 74. Valve seat portion 74 preferably has a machined surface 75 adapted to be engaged by a valve closure assembly 156.

A retainer 80 includes a plurality of radially extending rib members 82 having projections 83 which engage slots or catches 84 provided in valve body 70. Retainer rib members 82 extend inwardly and upwardly and have a generally horizontal engagement portion 85 which is adapted to engage an operator 142 having threads 151 adapted to engage threads 162 provided on depending closure operator 160. Operator 142 includes a split collar 144 and a shoulder 145 which horizontal portion 85 of ribs 82 engage. Head portion 163 of operator 160 is maintained in place by means of a depending member 166 held in place with fasteners 167 extending through openings 167a in member 166 providing clearance. Member 166 includes depending guides 168 having catches 170 which in open position engage the internal surface of valve body 74 at the position indicated at 175. Depending portion 168 is radially spaced from retainer ribs 82. The cross section of depending member 166 is reduced in the area of ribs 82 and includes an outwardly extending portion 172 which holds in place a keeper 174 which in turn holds in place an elastomeric seal 176. Clearance is provided at 178 between the upper surface of keeper 174 and valve closure 157. In the event that clearance indicated at 166a exists between closure 157 and member 166, fasteners 167 are utilized to take up the clearance indicated at 166a. As this clearance is taken up, outwardly extending portion 172 and keeper 174 will move upwardly to reduce the clearance 178. Clearance exists between closure 157 and head portion 163 as indicated at 179, and between member 166 and the upper surface of flange or shoulder 145 to enable the closure 157 and member 166 to concurrently move downwardly in the event that seal member 176 softens, melts or burns. During such downward movement, since operator 160 is threadably engaged with threads 151, when closure member 157 and member 166 move downwardly relative to shoulder 144, reducing clearance 166b, the clearance indicated at 179 between head 163 and closure 157 is accordingly reduced.

A lower operator 130 located within housing 16 includes a lower circular portion 132 extending through a insert guide 134 and a seal 135. A lower connection portion 136 is provided which can be operated by a suitable tool upon removal of cap 137. A thrust washer 138 is mounted upon housing 16 which is engaged by a shoulder 139 provided on shaft 132. Hair pin shaped retainer 181 held by fasteners 182 prevents shaft 132 from unnecessary vertical movement when depending housing 16 is not attached to valve body 70 and cap 137 is not in place. Shaft 132 includes a vertical extension 140 having an engagement portion 140a of the square cross section as shown in FIG. 2B.

The operation is similar to that in U.S. Pat. No. 3,981,481. To unload the lading cap 24 is removed and a suitable unloading conduit attached to external threads 25 or internal threads 27. Cap 137 is removed and a suitable tool attached to connection portion 136. Rotation of operating shaft 132 through engagement of portions 140a and 143 causes initial rotation of valve closure 157, keeper 174 and elastomeric seal 176 upon valve seat 75 until depending members 168 engage ribs 82. Valve closure 157 then moves vertically to allow the lading to flow out.

During vertical movement of valve closure 157, guides 168 engage the internal surface of valve body 72 to guide vertical movement. Retainer ribs 82 maintain operator 142 spaced from the walls of the valve body 70, and vertically fixed but rotatable.

Rotational movement of closure 157 is limited by the spacing between depending guides 168 of member 166 and radially extending rib members 82 of retainer 80. In both opening or closing of valve assembly 156 a wiping action occurs between seal 176 and valve seat 75. This feature is embodied in ACF application Ser. No. 804,664 now U.S. Pat. No. 4,124,193, and Ser. No. 804,663 both filed June 8, 1977, also hereby incorporated into the present application by this reference.

After unloading or loading the lading, to move the closure member 157 into the closed position an unloading tool is utilized to rotate shaft 132 in the opposite direction from that used to raise the closure. As the closure member 157 descends, keeper 174 and elastomeric seal 176 again engage valve seat 175. In the event that the tank and/or the lading is overheated and elastomeric seal 176 softens, melts or catches fire, the lading will force closure members 157 and 166 downwardly relative to operator 160 and shoulder 145, until closure 157 seats on valve seat 75. To the extent that seal 176 is softened or liquified, it will pass radially outwardly between closure 157 and seat 75. Thus valve closure 157 constitutes a supplemental seal which automatically moves into seated position on seat 75 in the event of softening, melting or burning of seal 176, allowing only a small amount, if any, lading to escape. With housing 16 in place any escaped lading accumulates in spout 220.

It is therefore apparent that the bottom operable valve closure of the present invention has the following advantages.

Clearance is provided at 166b and 179, whereby if the elastomeric seal softens, melts, or burns, the valve closure will move vertically downwardly relative to the keeper by virtue of the weight of the lading to assume a seated position on valve seat 75. Thus a supplemental seal is provided to avoid a substantial amount of lading escaping in the event of softening, melting or burning of seal 176.

The valve body 70 includes a flange portion 71 for attachment of the valve body to a universal flange 100 found on most tank cars.

Finally, a single upwardly extending operator may be provided in valve housing 16 instead of the dual vertically extending operators 33 and 38 shown in FIG. 1 and in U.S. Pat. No. 3,981,481.

In the event housing 16 is wiped off due to impact, for example in a derailment along shearing line 20, the valve assembly will remain closed and prevent loss of lading. A new housing 16 or equivalent may be attached with fasteners 18 to open closure 157 with operators 132 and 142 to unload the lading.

To unload the lading quickly without attaching a housing 16, it is necessary to attach a plate below valve body 70, which extends inwardly sufficient to support retainer 80, and having a center opening through which a tool may be inserted to rotate operator 142.

Figure 3:
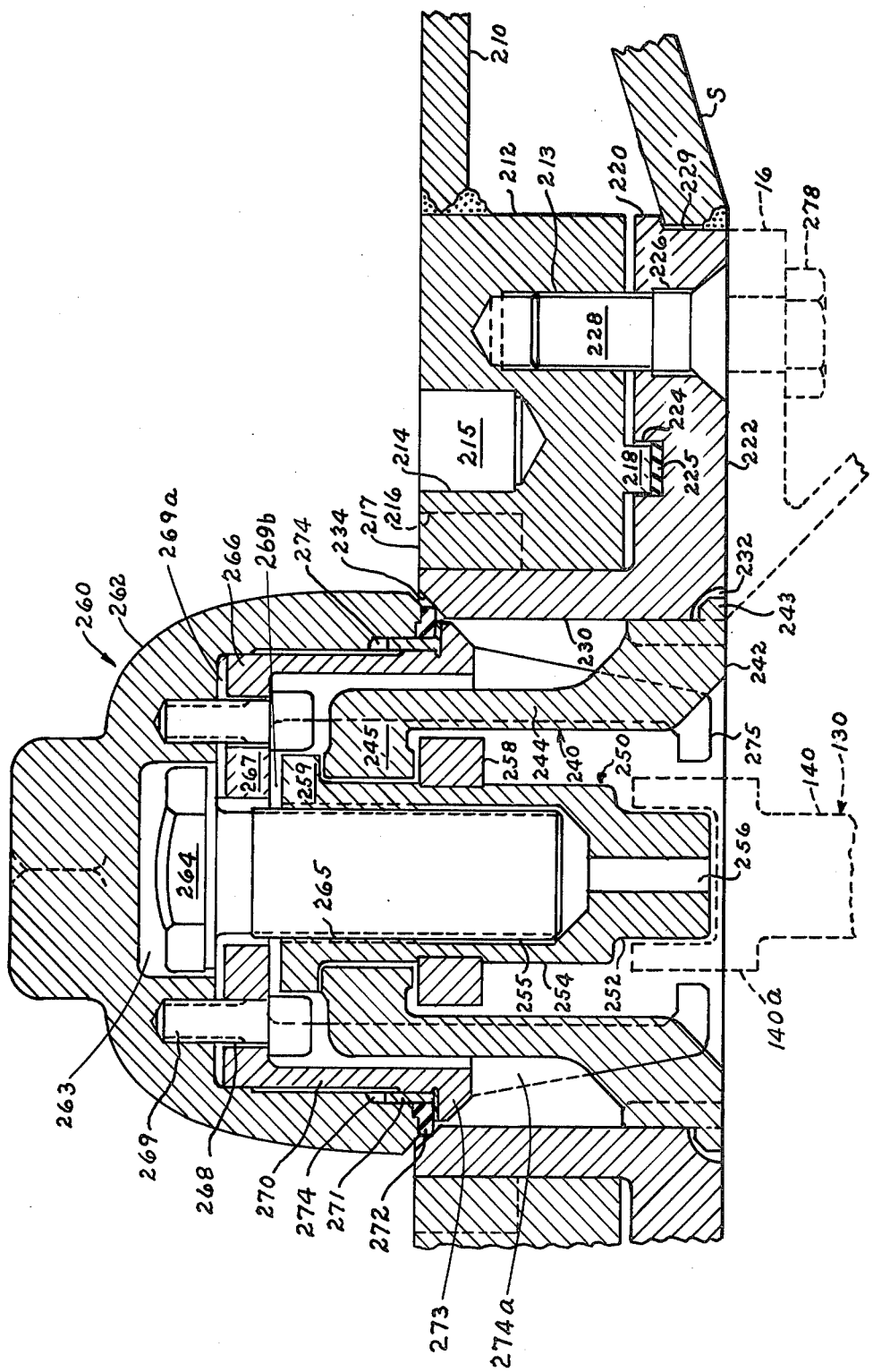
FIG. 3 is a sectional view of another embodiment of the present invention.

Another embodiment of the invention is shown in FIG. 3. In addition to application to new cars, this embodiment illustrates the application of the closure assembly of the present invention to retrofit of existing tank cars. Many existing cars include a tank bottom 210 having a universal flange 212 welded thereto. The universal flange 212 includes fastener openings 214 and slots 216 which were utilized to hold a top operated lading valve in place. For retrofit the top operator valve structure is removed and plugs 215 and a ring 217 are welded in place in applications in which the cars are to be used in service where contamination control is important, such as in food service.

Some universal flanges 212 also include a depending lug 218. A valve body 220 includes a flange portion 222 which is provided with a slot 224 having a circumferential seal 225 which engages depending lug 218. Flange portion 220 includes an opening 226 through which fasteners 228 are inserted which extend into aligned opening 213 in universal flange 212. Flange portion 220 may also include a circumferential slot 229 to receive a skid S which is welded thereto.

Valve body 220 includes a generally vertical seat portion 230 including lower slots 232 and an upper machined valve seat 234.

A retainer 240 includes radially extending arms 242 having lower projections 243 which extend into slots 232. Arms 242 include a vertical portion 244 and horizontal engagement portion 245.

An operator 250 includes a connection portion 252 and a body portion 254 which is internally threaded at 255 and includes a drain hole 256. Retainer connection portion 245 engages a split collar 258 and a shoulder 259.

A closure assembly 260 includes a closure member 262 having a clearance opening 263 into which is inserted a depending operator 264. Operator 264 is externally threaded at 265 and is held in place by a depending member 266 having a horizontal flange portion 267. Flange portion 267 includes openings 268 through which fasteners 269 pass with clearance to hold depending member integral with closure member 262. Depending 266 includes a depending portion 270 which holds in place a metallic keeper 271 and an elastomeric seal 272 by means of a ledge 273. Clearance is provided at 274 between keeper 271 and closure member 272 in order to take up any clearance 269a which may exist between closure 262 and member 267. As fasteners 269 are tightened, the clearance 269a and the clearance 274 above keeper 271 will be reduced. Clearance is provided at 269b between member 267 and shoulder 259 to allow closure 262 and member 267 to move downwardly relative to shoulder 259 in the event that the seal 272 melts, softens or burns. Since operator 265 is threadably engaged with threads 255 on operator 254, as valve closure 262 and member 267 move downwardly relative to shoulder 259 and clearance 269b is reduced, the clearance 263 above head 264 is correspondingly reduced. Depending portion 270 further includes a guide portion 274a having inwardly directed catches 275. In the full open position catches 275 engage the split collar 258 which provides an open position stop. The length of threaded portions of 255 and 265 should be at least equal to the distance between catches 275 and split collar store 258 in the closed position.

A housing similar to housing 16 shown in FIG. 2 (shown dotted in FIG. 3) having an internal operator 130 is bolted onto valve body flange portion 222 with fasteners 278 located on the same bolt circle as fasteners 228, but circumferentially spaced therefrom. Operator 130 includes a shaft portion 140 and an upper non-round polygon engagement portion 140a which drivably engages connection portion 252 of operator 250.

The operation of this embodiment is similar to the embodiment shown in FIG. 2. Rotation of operator 130 causes rotation of operator 250 and rotation of depending member 264 until depending guides 274a engage retainer arms 244, in so doing the seat 234 is wiped by seal 272. Subsequent rotation of operators 130 and 250 causes vertical movement of closure assembly 260 until catches 275 engage split collar stop 258. The process is reversed to move the valve closure into the closed position.

This valve assembly may be provided with a greater distance of travel between opened and closed positions, for example, two (2) inches of travel resulting in a distance of 1½ inches from the tank bottom to facilitate removal of viscous commodities, as compared to the valve closure in open position, for example with a distance of about 1¼ inches in U.S. Pat. No. 3,981,481 and the embodiment shown in FIG. 2.

Furthermore, this embodiment is adapted to retrofitting existing cars having a universal flange and which previously had top operated valves. A ring 217 and plugs 215 are inserted into openings 216 and 214 for service in commodities in which contamination control is important.

Having catches 275 turned inwardly rather than outwardly as in U.S. Pat. No. 3,981,481 simplifies the construction of valve body vertical portion 230. No catch need be formed therein.

This embodiment also includes the safety feature that if seal 262 should soften, melt or burn, when the valve closure is moved into the closed position, the lading will force closure member 262 downwardly, taking up clearances 263 and 269b until closure 262 seats on valve seat 234, preventing little or no lading from escaping.

If housing 16 is sheared off and operator 130 drops off the same situation prevails as was discussed in connection with FIG. 2.

What is claimed is:

1. A bottom operable lading valve assembly for railway tank cars comprising:
 a valve body adapted to be integrally attached to an opening in the bottom of a tank; said valve body having a valve body opening therein; a retainer fitting within said valve body opening, including a connection portion and a flange portion for attaching said retainer to said valve body, said retainer including at least one retainer rib extending radially inwardly from said flange portion and terminating in a retainer connection portion having a center hub; said center hub engaging a valve operator having a flange located above said hub; said flange having an upper surface; a valve closure movable between open and closed positions relative to a valve seat located within said valve body opening; said center hub slidingly engaging said valve operator to allow rotation of said valve operator while maintaining said valve operator spaced from said valve body and vertically fixed; said valve operator having upper operator threads engaging a valve closure stem depending from said valve closure having stem threads which engage said valve operator threads; said valve closure having an opening and said closure stem having a stem portion which fits within said closure opening with vertical clearance between said stem portion and said closure; said valve closure having at least one depending member in addition to said stem extending downwardly sufficiently far to engage said rib when said closure is in open and closed positions, said depending member having support means which support a circumferential elastomeric seal located below the lower surface of said valve closure; said elastomeric seal having a maximum vertical dimension less than said vertical clearance; whereby during rotation of said valve operator in a first direction to move said closure from closed to open position, said depending member assumes an engaged position with said rib, which prevents rotation of said closure; and whereby rotation of said valve operator in said first direction causes said closure to move vertically toward open position without rotation; said depending member being spaced from the upper surface of said flange a distance at least equal to said vertical clearance; valve closure stop means which engage when said closure assumes the full open position; and whereby rotation of said valve operator in open position in a second direction, opposite to said first direction, causes said depending member to engage said rib, and whereby rotation of said valve operator causes said closure to move vertically downwardly to a closed and seated position with said seal engaging said valve seat; and whereby, if the circumferential seal softens, melts or burns, said closure can move vertically downwardly relative to said valve operator, and said closure will engage said valve seat and substantially prevent escape of lading from the tank.

2. A bottom operable valve assembly according to claim 1 wherein the valve body is attached to a universal flange with mechanical fasteners and wherein said universal flange is integrally attached to the tank.

3. A bottom operable valve assembly according to claim 2 wherein said universal flange contains openings used for a previous unloading valve and wherein said openings are filled to prevent lading contamination.

4. A bottom operable valve assembly according to claim 1 wherein said valve body includes a slot and said retainer includes a projection which engages said slot to maintain said retainer in position.

5. A bottom operable lading valve assembly according to claim 1 wherein said support means support a seal keeper which in turn supports said elastomeric seal.

6. A bottom operable lading valve assembly according to claim 1 wherein said valve closure stop means include circumferentially spaced outwardly directed projections which engage a portion of said valve body when said valve closure assumes the open position.

7. A bottom operable lading valve assembly according to claim 1 wherein said valve closure stop means include circumferentially spaced inwardly directed projections which engage a projection stop located on said valve operator.

8. A bottom operable lading valve assembly according to claim 7 wherein said stop means include an internal stop located on said valve operator.

9. A bottom operable valve assembly according to claim 8 wherein said valve closure travels at least about two (2) inches in moving between open and closed positions and wherein in the full open position said closure is located at least about 1½ inches above said tank bottom to facilitate unloading of viscous commodities.

10. A bottom operable lading valve assembly according to claim 8 wherein said internal stop comprises a split collar surrounding said valve operator which also supports said retainer rib.

* * * * *